United States Patent
Kim et al.

(10) Patent No.: US 9,739,866 B2
(45) Date of Patent: Aug. 22, 2017

(54) METHOD AND APPARATUS FOR RADIO DIRECTION FINDING

(71) Applicant: ELECTRONICS AND TELECOMMUNICATIONS RESEARCH INSTITUTE, Daejeon (KR)

(72) Inventors: Kanghee Kim, Daejeon (KR); Ki Cheol Tae, Daejeon (KR); Chung Sup Kim, Jeollanam-do (KR)

(73) Assignee: ELECTRONICS AND TELECOMMUNICATIONS RESEARCH INSTITUTE, Daejeon (KR)

( * ) Notice: Subject to any disclaimer, the term of this patent is extended or adjusted under 35 U.S.C. 154(b) by 919 days.

(21) Appl. No.: 14/068,727

(22) Filed: Oct. 31, 2013

(65) Prior Publication Data

US 2014/0125524 A1    May 8, 2014

(30) Foreign Application Priority Data

Nov. 6, 2012  (KR) .................. 10-2012-0124700
Oct. 10, 2013  (KR) .................. 10-2013-0120307

(51) Int. Cl.
  *G01S 5/02* (2010.01)
  *G01S 3/14* (2006.01)
(52) U.S. Cl.
  CPC .................... *G01S 3/14* (2013.01)
(58) Field of Classification Search
  CPC ........................................... G01S 3/14
  USPC ........................................... 342/417
  See application file for complete search history.

(56) References Cited

U.S. PATENT DOCUMENTS

| | | | | |
|---|---|---|---|---|
| 4,983,983 A | * | 1/1991 | Huntley | G01S 3/12 342/430 |
| 6,018,317 A | * | 1/2000 | Dogan | G01S 3/74 342/373 |
| 8,274,432 B2 | * | 9/2012 | Frieaizen | G01S 3/48 342/465 |

(Continued)

FOREIGN PATENT DOCUMENTS

| | | | |
|---|---|---|---|
| CA | WO 2008107730 A1 * | 9/2008 | ......... H04L 27/2657 |
| KR | 100822705 B1 | 4/2008 | |
| KR | 1020110057966 A | 6/2011 | |

OTHER PUBLICATIONS

M.L. Welborn, "Narrowband Channel Extraction for Wideband Receivers", 1999 International Conference on Acoustics, Speech and Signal Processing, Mar. 1999.*

*Primary Examiner* — Frank J McGue
(74) *Attorney, Agent, or Firm* — Ladas & Parry LLP; Loren K. Thompson

(57) ABSTRACT

An apparatus for radio direction finding, the apparatus comprising: a receiver configured to receive target signals to be subjected to the direction finding of signal sources, which are acquired by an antenna array; a channel profiler configured to produce profiles of the target signals received through the receiver; a pre-analyzer configured to preemptively process in a narrowband the wideband target signals based on the profiles that are produced by the channel profiler to produce pre-analyzed information for the wideband target signals; and a direction finder configured to perform the direction finding on the signal sources using the pre-analyzed information and the profilers of the target signals.

19 Claims, 4 Drawing Sheets

(56) References Cited

U.S. PATENT DOCUMENTS

| | | | |
|---|---|---|---|
| 2001/0004249 A1 | 6/2001 | Sharp et al. | |
| 2012/0169542 A1* | 7/2012 | Mathews | G01S 5/021 342/450 |
| 2012/0183037 A1* | 7/2012 | Allpress | H04L 25/03019 375/232 |

* cited by examiner

METHOD AND APPARATUS FOR RADIO DIRECTION FINDING

RELATED APPLICATIONS

This application claims the benefit of Korean Patent Application Nos. 10-2012-0124700, filed on Nov. 6, 2012 and 10-2013-0120307, filed on Oct. 10, 2013, which is hereby incorporated by reference as if fully set forth herein.

FIELD OF THE INVENTION

The present invention relates to a technology for direction finding of target signals existing on wideband using an antenna array, and more particularly, to a technology for direction finding adapted to improve the accuracy of direction finding through an analysis of direction finding signals.

BACKGROUND OF THE INVENTION

The direction finding technique of radio signals may be roughly divided into a wideband direction finding technology and a narrowband direction finding technology depending on the range of simultaneous finding.

Narrowband direction finding is a single direction finding technology used in a narrow frequency band at which there exists one interest signal and has an excellent accuracy of direction finding. The wideband direction finding is a technology used in a wide frequency band at which a number of narrowband interest signals exist to detect the signals existed in the wideband and has a poor accuracy of direction finding as compared with the narrowband direction finding technology. However, the wideband direction finding is able to cover a wider band in a single system, and thus, is essentially used in a field of automated monitoring of radio waves.

Problem in both of the wideband and narrowband direction finding technologies is a lowered accuracy of the direction finding if signal strength of a target signal is weak or a finding time is shorter compared to a full finding time. Although detailed reasons why the accuracy of the direction findings decreases may be different, the problem may be generally caused by environmental factors that the signals cannot be properly detected or extracted.

In the field of common wireless communications, in order to solve the problem, there has been introduced a method of digital beam-forming signals received by an antenna array to eliminate spatial interference affected on the received signal. This method has an advantage in terms of the direction detection to reduce the spatial interference of the target signal, but still has a technical constraint in the improvement of the basic performance in the direction finding for detecting the direction of a signal source originating from the direction unspecified.

SUMMARY OF THE INVENTION

In view of the above, the present invention provides an apparatus and method for direction finding capable of improving the analysis performance and accuracy of direction finding by detecting several spatial division signals obtained by a digital beam-forming approach and providing information to be used in direction finding through pre-analysis.

In accordance with an aspect of an exemplary embodiment of the present invention, there is provided an apparatus for radio direction finding, which includes: a receiver configured to receive target signals to be subjected to the direction finding of signal sources, which are acquired by an antenna array; a channel profiler configured to produce profiles of the target signals received through the receiver; a pre-analyzer configured to preemptively process in a narrowband the wideband target signals based on the profiles that are produced by the channel profiler to produce pre-analyzed information for the wideband target signals; and a direction finder configured to perform the direction finding on the signal sources using the pre-analyzed information and the profilers of the target signals.

The apparatus further comprising: a post-analyzer configured to process a post-analysis of the target signals using the resultant direction finding of the direction finder.

In the embodiment, wherein the channel profiler comprises: a space channel divider configured to form space channels using the wideband signals for each antenna of the antenna array; a single space channel profiler configured to analyze the space channels to extract signal information; and a post-channel profiler configured to collect the signal information to produce the profiles of the target signals.

In the embodiment, wherein the space channel divider is configured to apply a digital beam-forming algorithm to the target signals, thereby forming the space channels.

In the embodiment, wherein the digital beam-forming algorithm is configured to detect a specific direction of the target signals.

In the embodiment, wherein the direction finder comprises: a narrowband channelizer configured to extract narrowband channels using the pre-analyzed information and the profiles of the target signals; and a direction finding executor configured to perform the direction finding on the target signals using narrowband array antenna signal of the narrowband channels that are extracted.

In the embodiment, wherein the direction finder further comprises a narrowband channel extractor configured to extract narrowband channels having a predetermined target signal using the narrowband channels and the resulting direction finding that are derived from the direction finding executor.

In the embodiment, wherein the narrowband channelizer is configured to generate a delay time in order to acquire the pre-analyzed information.

In accordance with another aspect of an exemplary embodiment of the present invention, there is provided a method for radio direction finding in a direction finding apparatus, which includes: receiving target signals to be subjected to the direction finding of signal sources, which are acquired by an antenna array; producing profiles of the received target signals; preemptively processing in a narrowband the wideband target signals based on the profiles that are produced to produce pre-analyzed information for the wideband target signals; and performing the direction finding on the signal sources using the pre-analyzed information and the profiles of the target signals.

The method further comprising: processing a post-analysis of the target signals using the resultant direction finding of the signal source.

In the embodiment, wherein said producing profiles of the received target signals comprises: forming space channels using the wideband signals for each antenna of the antenna array; analyzing the space channels to extract signal information; and collecting the signal information to produce the profiles of the target signals.

In the embodiment, wherein said forming space channels comprises: applying a digital beam-forming algorithm to the target signals, thereby forming the space channels.

In the embodiment, wherein the digital beam-forming algorithm is used to detect a specific direction of the target signals.

In the embodiment, wherein said performing the direction finding on the signal sources comprises: extracting narrowband channels using the pre-analyzed information and the profiles of the target signals; and performing the direction finding on the target signals using narrowband array antenna signal of the narrowband channels that are extracted.

In the embodiment, wherein said performing the direction finding on the signal sources further comprises: extracting narrowband channels having a predetermined target signal using the narrowband channels and the resulting direction finding.

In the embodiment, wherein said extracting narrowband channels comprises generating a delay time in order to acquire the pre-analyzed information.

In accordance with an embodiment of the present invention, it is possible to enhance the accuracy of the direction finding by preemptively extracting precise information necessary for direction finding through space division and pre-analysis of the target signals. Further, it is possible to increase the accuracy of the monitoring in a field of automated monitoring of radio waves by analyzing and extracting the target signals based on the resulting direction finding through the multi stage analysis thereof.

BRIEF DESCRIPTION OF THE DRAWINGS

The above and other objects and features of the present invention will become apparent from the following description of the embodiments given in conjunction with the accompanying drawings, in which.

DETAILED DESCRIPTION OF THE EMBODIMENTS

Figure 1:
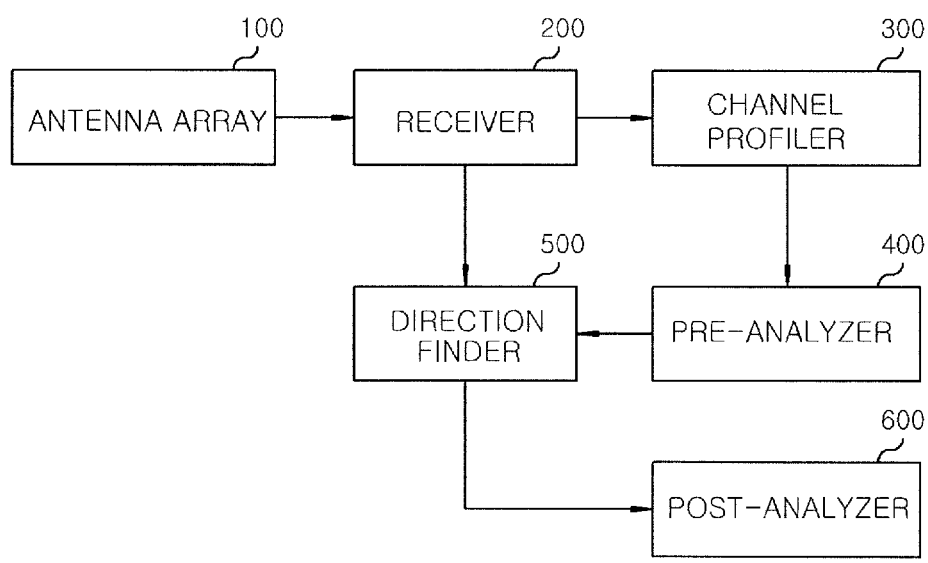
FIG. 1 is a block diagram of an apparatus for radio direction finding in accordance with an embodiment of the present invention.

The advantages and features of exemplary embodiments of the present invention and methods of accomplishing them will be clearly understood from the following description of the embodiments taken in conjunction with the accompanying drawings. However, the present invention is not limited to those embodiments and may be implemented in various forms. It should be noted that the embodiments are provided to make a full disclosure and also to allow those skilled in the art to know the full scope of the present invention. Therefore, the present invention will be defined only by the scope of the appended claims. Similar reference numerals refer to the same or similar elements throughout the drawings.

In the following description, well-known functions or constitutions will not be described in detail if they would unnecessarily obscure the embodiments of the invention. Further, the terminologies to be described below are defined in consideration of functions in the invention and may vary depending on a user's or operator's intention or practice. Accordingly, the definition may be made on a basis of the content throughout the specification.

Moreover, the respective blocks or the respective sequences in the appended drawings may indicate modules, segments, or some of codes including at least one executable instruction for executing a specific logical function(s). In several alternative embodiments, it is noticed that the functions described in the blocks or the sequences may run out of order. For example, two successive blocks and sequences may be substantially executed simultaneously or often in reverse order according to corresponding functions.

Before describing the embodiment of the present invention, a description will be made of a radio direction finding that is roughly divided into narrowband direction finding and wideband direction finding, as follows.

In a field of automatic monitoring of radio wave, it is necessary to employ a system for monitoring a wide area, rather than simple system or low-priced system, that is, a wideband direction finding technique is mainly used since it is capable of direction finding a plurality of signals of interest at the same time, thereby effectively monitoring the wideband signals.

However, the wideband direction finding technique may have a reduced accuracy of direction finding if signal strength of the interest signal is weak or the analysis time is shorter compared with a unit of analysis time. Moreover, the wideband direction finding technique cannot sufficiently secure analyzed information of signals necessary for the direction finding in advance, which results in deteriorating the performance of direction finding itself.

Therefore, the embodiment of the present invention is intended to propose a technology of radio direction finding to overcome the drawbacks as set forth above.

Hereinafter, the embodiments of the present invention will be described in detail with reference to the accompanying drawings.

FIG. 1 is a block diagram of an apparatus for radio direction finding radio signals in accordance with an embodiment of the present invention, which includes an antenna array 100, a receiver 200, a channel profiler 300, a pre-analyzer 400, a direction finder 500, and a post-analyzer 600.

Referring to FIG. 1, the antenna array 100 performs a direction finding on moving targets, that is, wideband signal sources to be subjected to the direction finding. Examples of the antenna array 100 may include but is not limited to a linear antenna array, a planar antenna array, and the like.

The receiver 200 serves to receive the wideband target signals acquired by the antenna array 100 and passes the received wideband target signals to both of the channel profiler 300 and the direction finder 500.

The channel profiler 300 is responsible for producing wideband target signal profiles for the wideband target signals that are received through the receiver 200.

Figure 2:
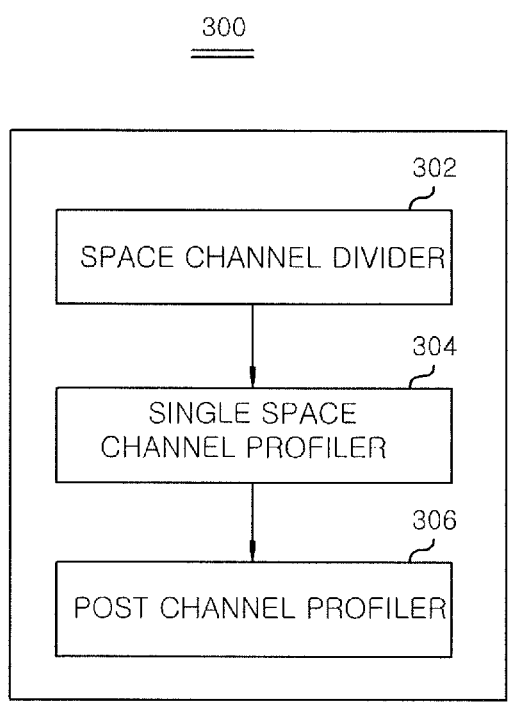
FIG. 2 is a detailed block diagram of the channel profiler shown in FIG. 1.

FIG. 2 is a detailed block diagram of the channel profiler 300 shown in FIG. 1, which includes a space channel divider 302, a single space channel profiler 304 and a post channel profiler 306.

Referring to FIG. 2, the spatial channel divider 302 processes the wideband target signals for each antenna element in the antenna array 100 to form space channels.

The single space channel profiler 304 analyzes the respective space channels that are formed by the space channel divider 302 to extract signal information necessary for the direction-finding.

The post channel profiler 306 collects the signal information extracted by the single space channel profiler 304 to provide profiles for all of the target signals. The profiles for the target signals provided from the post channel profiler 306 may include signal properties such as a time, a frequency, space information, a kind, a statistical characteristic, a shape, and the like of each target signal.

Figure 3:
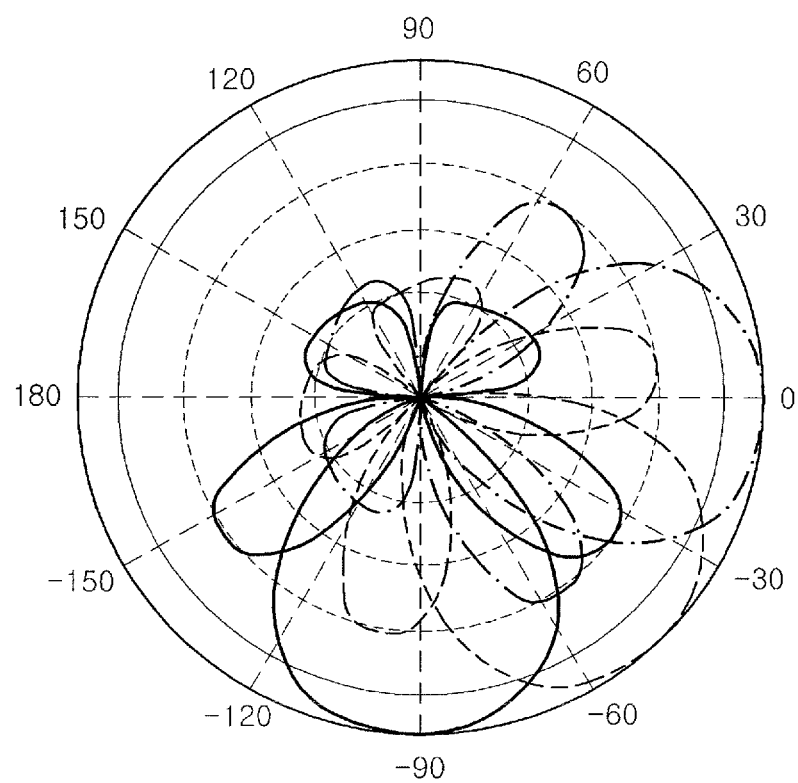
FIG. 3 illustrates a digital beam-forming approach which is applied to an embodiment of the present invention.

Meanwhile, as shown in FIG. 3, the space channel divider 302 forms plural beams using a digital beam-forming algorithm depending on a resolving power of the antenna array 100.

As illustrated in FIG. 3, the respective beams may be overlap with each other, and the shape information of the beams that are produced by the space channel divider 302 is commonly shared with the post channel profiler 306 so that it can be reflected in the process of producing the profiles of the target signals by the post channel profiler 306.

Referring again to FIG. 3, the pre-analyzer 400 preemptively process in a narrowband the wideband target signals based on the profilers that are produced by the channel profiler 300 to produce pre-analyzed information for the wideband target signals.

More specifically, the pre-analyzer 400 pre-analyzes the wideband target signals on a narrowband basis through the use of space signals from which the interference affected on the wideband target signals is lowered to provide information necessary for correctly carrying out the direction finding, for example, a center frequency, a bandwidth, an existence time, an existence space, a signal detection statistical property, a signal-specific characteristic and the like.

In the course of analyzing a specific target signal, the pre-analyzer 400 may pre-analyze a specific target signal to classify a modulation scheme or to extract a modulation characteristic, and the information thus classified and extracted may be utilized in direction finding by the direction finder 500.

Also, the profiles of the target signals from the channel profiler 300 are used in the pre-analyzer 400 and then collected with the information necessary for the direction finding by the direction finder 500.

Figure 4:
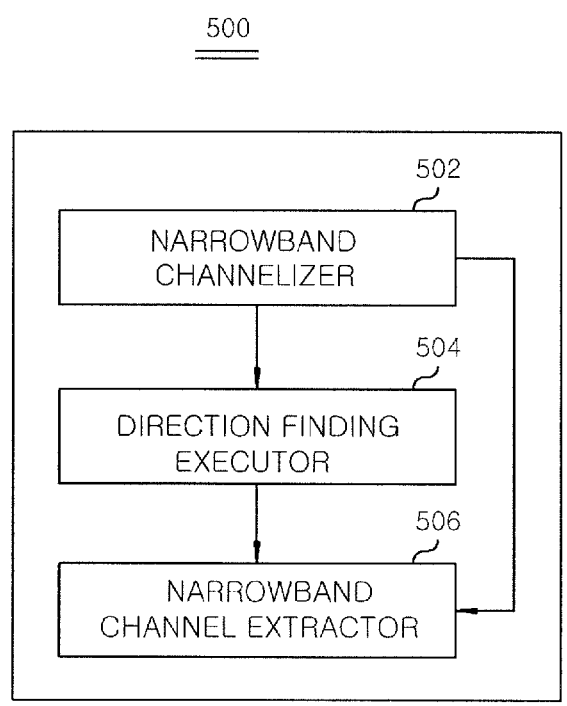
FIG. 4 is a detailed block diagram of the direction finder shown in FIG. 1.

FIG. 4 is a detailed block diagram of the direction finder 500, which includes a narrow band channelizer 502, a direction finding executor 504, and a narrowband channel extractor 506.

The narrowband channelizer 502 serves to extract precise narrowband channels having narrowband array antenna signals from the wideband target signals provided from the receiver 200 by using the profile information and the pre-analyzed information about the wideband target signals. When extracting the narrowband channels, the narrowband channelizer 502 generates a delay time necessary to acquire the pre-analyzed information. Further, the narrowband channelizer 502 may be capable of extracting separate narrowband channels with a good signal quality using the space channels of the wideband target signals.

The direction finding executor 504 performs the direction finding on the wideband target signals using the narrowband array antenna signals that are extracted by the narrowband channelizer 502. In this case, there is no special limitation to the direction finding algorithm. The direction finding algorithm is well known to those skilled in the art and thus the description thereof will be omitted for the simplicity of description.

The narrowband channel extractor 506 extracts the narrowband channels having preset target signals using the narrowband array antenna signals of the narrowband channels from the narrowband channelizer 502 and the results of the direction finding performed by the direction finding executor 504. For example, the narrowband channel extractor 506 may analyze the properties of the narrowband signals to extract narrowband channels with a good signal quality while steering the beams in a direction to which the narrowband signals yield maximum gains or modulating the beams.

The post analyzer 600 processes the results of the direction finding and the extracted precise narrowband channels that are derived from the direction finder 500 to produce a final analysis. For example, the final analysis may be achieved by using the profiles, pre-analyzed results and the direction finding results. The post-analysis based on the direction finding enables even the analysis of a single target signal composed of a plurality of narrowband signals by analyzing the precise narrowband target signal channels and weak wideband signals.

As set forth above, the embodiment of the present invention preemptively extracts precise information necessary for direction finding through space division and pre-analysis of the target signals, thereby enhancing the accuracy of the direction finding. Further, the embodiment analyzes and extracts the target signals based on the resulting direction finding through the multi stage analysis thereof, thereby increasing the accuracy of the monitoring in a field of automated monitoring of radio waves.

While the invention has been shown and described with respect to the embodiments, the present invention is not limited thereto. It will be understood by those skilled in the art that various changes and modifications may be made without departing from the scope of the invention as defined in the following claims.

What is claimed is:

1. An apparatus for radio direction finding, the apparatus comprising:
   a receiver that receives target signals acquired by a wideband antenna array in which the wideband antenna array comprises antenna elements;
   a channel profiler for producing profiles of the target signals for each antenna element in the wideband antenna array received through the receiver by forming space channels, extracting signal information from the space channels, and producing the profiles from the extracted signal information wherein the profiles are selected from the group consisting of time, frequency, space information, kind, statistical characteristic, and shape;
   a pre-analyzer to preemptively process in a narrowband the target signals based on the profiles that are produced by the channel profiler to produce pre-analyzed information for the target signals in which the pre-analyzed information is selected from the group consisting of a center frequency, a bandwidth, an existence time, an existence space, a signal detection statistical property, and a signal-specific characteristic; and
   a direction finder that performs the direction finding on the signal sources using the pre-analyzed information and the profiles of the target signals.

2. The apparatus of claim 1, further comprising:
   a post-analyzer to process the target signals using the direction found by the direction finder.

3. The apparatus of claim 1, wherein the channel profiler applies a digital beam-forming algorithm to the target signals to form the space channels.

4. The apparatus of claim 3, wherein the digital beam-forming algorithm detects the direction of the target signals.

5. The apparatus of claim 1, wherein the direction finder comprises:
   a narrowband channelizer configured to extract narrowband channels using the pre-analyzed information and the profiles of the target signals; and a direction finding executor configured to perform the direction finding on the target signals using narrowband array antenna signal of the narrowband channels that are extracted.

6. The apparatus of claim 5, wherein the direction finder further comprises a narrowband channel extractor configured to extract narrowband channels having a predetermined target signal using the narrowband channels and the resulting direction finding that are derived from the direction finding executor.

7. The apparatus of claim 5, wherein the narrowband channelizer is configured to generate a delay time in order to acquire the pre-analyzed information.

8. The method of claim 7, wherein the narrowband channel extractor configured to steer beams in a direction to yield maximum gains or maximum modulation of the beams.

9. The apparatus of claim 1, wherein the profiles are selected from the group consisting of time, frequency, space information, and shape.

10. The apparatus of claim 1, wherein the profiles are selected from the group consisting of kind and statistical characteristic.

11. The apparatus of claim 1, wherein the pre-analyzed information is selected from the group consisting of a center frequency, a bandwidth, and an existence time.

12. The apparatus of claim 1, wherein the pre-analyzed information is selected from the group consisting of an existence space, a signal detection statistical property, and a signal-specific characteristic.

13. A method for radio direction finding in a direction finding apparatus, the method comprising:
receiving target signals acquired by a wideband antenna array in which the wideband antenna array comprises antenna elements;
producing profiles of the target signals for each antenna element in the wideband antenna array by forming space channels, extracting signal information from the space channels, and producing the profiles from the extracted signal information, wherein the profiles are selected from the group consisting of time, frequency, space information, kind, statistical characteristic, and shape;
preemptively processing in a narrowband the target signals based on the profiles to produce pre-analyzed information for the target signals wherein the pre-analyzed information is selected from the group consisting of a center frequency, a bandwidth, an existence time, an existence space, a signal detection statistical property, and a signal-specific characteristic; and
performing the direction finding on the signal sources using the pre-analyzed information and the profiles of the target signals.

14. The method of claim 13, further comprising:
processing a post-analysis of the target signals using the direction.

15. The method of claim 14, wherein forming space channels comprises: applying a digital beam-forming algorithm to the target signals to form the space channels.

16. The method of claim 15, wherein the digital beam-forming algorithm is used to detect a specific direction of the target signals.

17. The method of claim 13, wherein said performing the direction finding on the signal sources comprises:
extracting narrowband channels using the pre-analyzed information and the profiles of the target signals; and
performing the direction finding on the target signals using narrowband array antenna signal of the narrowband channels that are extracted.

18. The method of claim 17, wherein said performing the direction finding on the signal sources further comprises:
extracting narrowband channels having a predetermined target signal using the narrowband channels and the resulting direction finding.

19. The method of claim 17, wherein said extracting narrowband channels comprises generating a delay time in order to acquire the pre-analyzed information.

* * * * *